(12) United States Patent
Hourdin

(10) Patent No.: US 9,744,517 B2
(45) Date of Patent: Aug. 29, 2017

(54) REACTOR WITH COLD TURNING PLASMA AND STREAM FORCING

(71) Applicant: Commissariat A L'Energie Atomique et Aux Energies Alternatives, Paris (FR)

(72) Inventor: Laurent Hourdin, Froidmont-Cohartille (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/171,576

(22) Filed: Jun. 2, 2016

(65) Prior Publication Data
US 2016/0354755 A1    Dec. 8, 2016

(30) Foreign Application Priority Data

Jun. 4, 2015 (FR) ...................... 15 55106

(51) Int. Cl.
*B01J 19/08* (2006.01)
*H05H 1/48* (2006.01)
*H05H 1/50* (2006.01)

(52) U.S. Cl.
CPC .............. *B01J 19/088* (2013.01); *H05H 1/48* (2013.01); *H05H 1/50* (2013.01); *B01J 2219/083* (2013.01); *B01J 2219/0809* (2013.01); *B01J 2219/0818* (2013.01); *B01J 2219/0852* (2013.01); *B01J 2219/0896* (2013.01); *B01J 2219/1946* (2013.01); *H05H 2001/483* (2013.01)

(58) Field of Classification Search
None
See application file for complete search history.

(56) References Cited

U.S. PATENT DOCUMENTS

| 3,378,713 A | 4/1968 | Ludwig |
| 2041/0230770 | 8/2014 | Kuthi et al. |

FOREIGN PATENT DOCUMENTS

| WO | WO 89/11775 A1 | 11/1989 |
| WO | WO 00/01047 A1 | 1/2000 |
| WO | WO 2014/167520 A1 | 10/2014 |

OTHER PUBLICATIONS

Search Report issued Mar. 3, 2016 in French Application No. 1555106, 2 pages.

*Primary Examiner* — Kishor Mayekar
(74) *Attorney, Agent, or Firm* — Brinks Gilson & Lione

(57) ABSTRACT

A reactor for forming a plasma in a flowing fluid that includes a central rod belonging to a first electrode, an insulator, a tubular body belonging to a second electrode and defining a cylindrical space for the flow of the fluid between the tubular body and the insulator. The reactor further includes control disk having a front face linked to a downstream end of the central rod, and a permanent magnet juxtaposed against a back face of the control disk. One or more ribs are on a front face of the control disk according to a pattern in relief defining successive starting points for an electric arc distributed around the central axis of the reactor so as to generate electric arcs situated on a reaction cone and appearing to turn around the central axis.

11 Claims, 3 Drawing Sheets

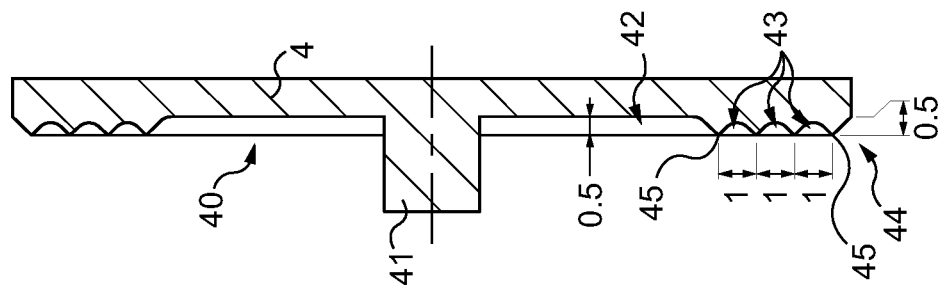
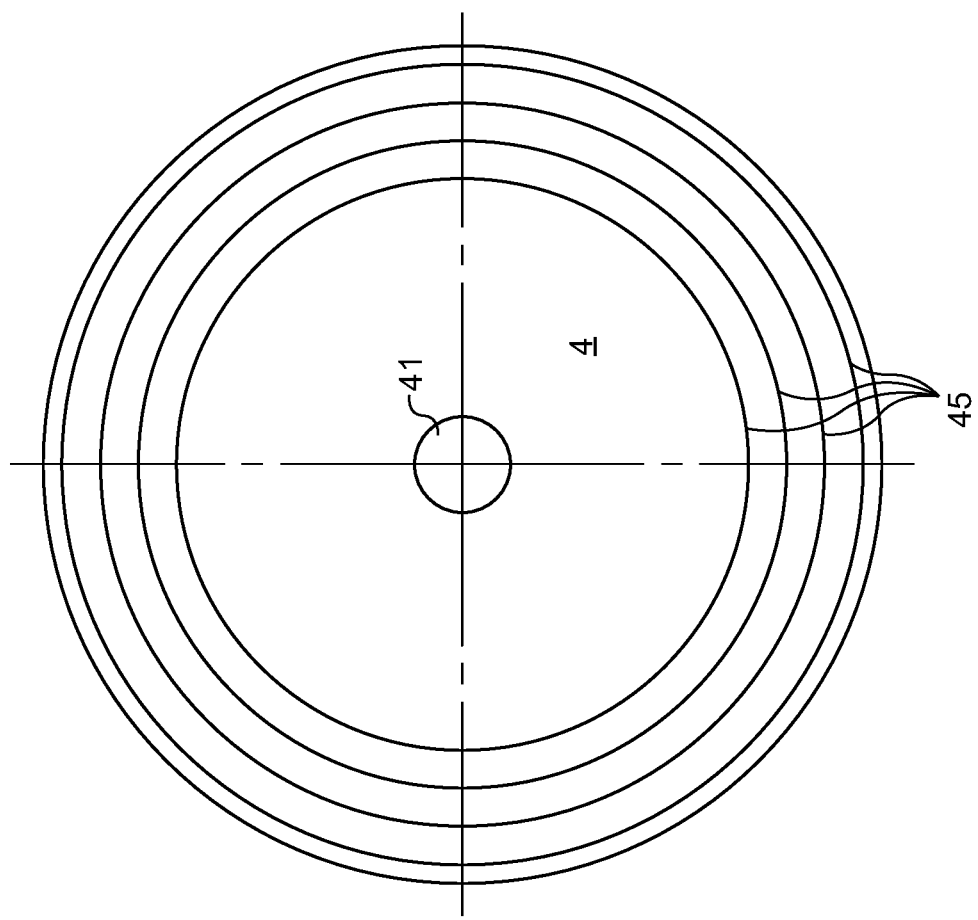

REACTOR WITH COLD TURNING PLASMA AND STREAM FORCING

RELATED APPLICATION

This application claims priority to French Patent Application No. 1555106 filed Jun. 4, 2015, the entire contents of which is incorporated by reference herein.

TECHNICAL FIELD

The disclosed subject matter relates to a plasma reactor for forming a plasma in a fluid.

BACKGROUND

Applications directed to the processing of gases by plasma treatment have been known for several decades. The field of the chemistry of processes implements them routinely to dissociate or combine molecules in gaseous or liquid phase.

The emphasis placed on research into the reverse conversion of carbon has led to the development of various reactors for which the optimization of yields has been the main motivation. The publication "*Carbon Dioxide Decomposition by plasma Methods and Application of High Energy and High Density plasmas in Material Processing and Nanostructures*" of 2010 in the names of Srivastava and Kobayashi reviews several of them that are used for the cracking of carbon dioxide (decomposition of carbon dioxide into oxygen and carbon). FIG. 1 of that earlier publication illustrates a conventional plasma reactor comprising an argon-based plasma torch of which the plasma jet is generated by an arc at atmospheric pressure between a central upstream electrode, in the form of a rod, and a peripheral downstream electrode, in the form of a washer chamfered at its center, the electrodes being subjected to direct current. The plasma torch is arranged at an axial end of a quartz tube delimiting a reaction chamber. The fluid to crack (carbon dioxide) is introduced radially into the device at the location of the exit from the plasma torch, at the entry into the quartz tube A drawback of such a reactor with a plasma torch is that it is relatively complex to implement and to integrate into a larger system on account in particular of the necessary presence of a store and a supply of argon for the plasma torch, and of the supply of the reactor with fluid to crack in a radial direction. For the same reasons, the arrangement of several reactors in series or in parallel is difficult.

A catalytic plasma reactor can also be seen in FIG. 1 of the 2011 publication "*Conversion of carbon oxides into a membrane in a nonthermal plasma-catalytic reactor*" in the names of Jwa, Mok and Lee, used for methanation of carbon dioxide (conversion of carbon dioxide into methane, by reaction with hydrogen). Such a catalytic plasma reactor comprises a quartz tube, in the center of which is placed a rod electrode acting as a discharge electrode, and externally of which is wound a copper sheet serving as ground electrode. The assembly is placed in a tubular oven adapted to heat reagents (hydrogen and carbon dioxide) and catalysts at 200-300° C. The discharge electrode is subjected to a high-voltage alternating current (between 6.5 and 10.3 kV) at a frequency of 1 kHz. Such a catalytic plasma reactor is simpler and more compact that the plasma torch reactor described above but the probability that a molecule of the fluid to convert flowing in the quartz tube passes through an arc generated between the two electrodes remains low, it being possible for arcs to occur over the whole length and whole circumference of the quartz tube in localized and random manner.

SUMMARY

The disclosed subject matter is directed to mitigating these drawbacks by providing a cold plasma reactor of very simple, compact and low-cost design and with a controlled yield. In a preferred version, the disclosed subject matter provides a reactor which may be manufactured from commercially available parts that are cheap and require little modification.

The disclosed subject matter provides a plasma reactor for forming a plasma in a flowing fluid, the reactor comprising:
  a first and a second electrode connected to a source of alternating voltage, for the creation of electric arcs between said first and second electrodes for the purposes of generating a plasma in the flowing fluid,
  a portion of vessel delimiting a reaction chamber within which the plasma is generated.

The reactor according to the disclosed subject matter is characterized in that:
  the first electrode comprises a central rod arranged on a central axis of the reactor, which central rod is enveloped with an insulator except for a downstream end, which projects from the insulator, and an upstream connection region, which thus remains accessible,
  the second electrode comprises a peripheral tubular body surrounding the insulator and having a discharge end situated in the reaction chamber,
  the reactor comprises a conducting disk, here called control disk, having a front face linked to the downstream end of the central rod of the first electrode,
  the reactor comprises a permanent magnet juxtaposed against a back face of the control disk,
  one or more grooves or ribs are formed on the front face of the control disk according to a pattern in relief defining successive electric arc starting points distributed around the central axis of the reactor so as to generate electric arcs situated on a cone referred to as reaction cone (the term "cone" here covering surfaces of conical, cylindrical or less regular shape), which electric arcs appear to turn around the central axis. For example, the front face of the control disk has at least one circular rib centered on the central axis. This rib may be the common border for two adjacent circular ribs obtained by etching the front face of the control disk.
  the reactor has a cylindrical space for flow between the tubular body and the second electrode and the insulator, into which cylindrical space the fluid is introduced and from which it leaves again within the reaction cone.

By connecting the first and second electrodes to a voltage source, a potential difference appears between the first and second electrodes, more specifically between the discharge end of the tubular body of the second electrode and the front face of the control disk which extends the central rod of the first electrode. Starting from a given threshold of potential difference, an electric arc forms between the two electrodes.

The presence of the magnet creates a magnetic field which influences the form of that electric arc and moves it. The successive points formed on the front face of the control disk define the points at which the arcs will arise.

By connecting the first and second electrodes to a source of DC voltage, arcs successively form on said points following the pattern in relief of the front face of the control disk, giving the impression of an electric arc turning around the central axis of the reactor. It is for this reason that the reactor according to the disclosed subject matter may be qualified as a turning plasma reactor.

In other words, the control disk makes it possible to have control over the location and the movement of the electric arcs forming in the reaction chamber.

By choosing a suitable frequency for the alternating source, the speed of movement of that turning arc may be sufficient to generate a sort of tubular curtain of plasma that is practically continuous and constant, the expression "tubular curtain of plasma" designating a tubular curtain of successive electric arcs able to transform the fluid into plasma (in order to obtain the desired reaction. This tubular curtain of plasma may be conical, cylindrical or of less regular shape according to the pattern in relief of the front face of the control disk.

Thanks to the cylindrical space for flow provided between the insulator and the tubular body of the second electrode, the fluid arrives in the reaction chamber near of the central axis (around the central rod of the first electrode), within the tubular curtain of plasma and is forced to pass through said tubular curtain of plasma. It is for this reason that the reactor according to the disclosed subject matter may be qualified as a turning plasma reactor with stream forcing. In a reactor according to the disclosed subject matter, the fluid is preferably made to flow continuously with a constant rate.

The frequency of the electrical source which makes it possible to maximize the yield (that is to say maximize the probability that a molecule of fluid encounters an electric arc) depends on various factors, among which are: the rate of supply with fluid which may depend on the application concerned and on the system in which the reactor is integrated (it will be understood that the higher the rate, the greater the speed of rotational movement of the arc around the central axis of the reactor); the geometry of the reactor assembly and in particular the distance between the discharge end of the tubular body of the second electrode and each point of the front face of the control disk. The person skilled in the art is capable of determining this frequency for optimum use.

Preferably, the discharge end of the tubular body of the second electrode is planar, in other words lacking any point. It follows that the electric arc may in principle occur spontaneously at any point of that discharge end.

According to a possible feature, the tubular body of the second electrode is perforated with flow holes open to the cylindrical flow space, and the fluid is introduced into the cylindrical flow space by those flow holes. The flow holes may be formed in radial directions or possibly in directions inclined between a radial direction and the axial direction.

According to a possible feature, the control disk and the permanent magnet each have a greater diameter than an outside diameter of the discharge end of the tubular body of the second electrode. It is then possible to obtain a conical tubular curtain of plasma. The respective diameters of the control disk and of the permanent magnet may be different, or, preferably, identical.

According to a possible feature, the portion of the vessel delimiting the reaction chamber is of a transparent material (transparent to visible light), for example of poly(methyl methacrylate), in order to be able to observe the tubular curtain of plasma and the reaction with the naked eye).

According to a possible feature, the reactor further comprises a portion of vessel forming an extension which extends axially and upstream the portion of vessel delimiting the reaction chamber. The fluid is then advantageously introduced axially into the portion of vessel forming an extension. It first of all flows in the axial direction between the insulator and the portion of vessel forming an extension, then crosses the tubular body of the second electrode (for example substantially radially) by the flow holes thereof, after which it again flows generally axially in the cylindrical flow space between the tubular body of the second electrode and the insulator, to outlet in a central part of the reaction cone (where the tubular curtain of plasma forms) in the reaction chamber; it is then deviated radially outwardly by the presence of the control disk to cross the reaction cone, then the fluid (which is then essentially reaction products) comes out of the reaction chamber preferably substantially axially.

According to a possible feature, the portion of vessel forming an extension is of a transparent material to enable visual inspection of the flowing fluid.

According to a possible feature, the reactor comprises:
  a flat conducting washer attached to the connection region of the central rod of the first electrode, and
  a first jack in contact with said flat conducting washer for the connection of the first electrode to the source of alternating voltage, the flat conducting washer being furthermore configured to enable its fastening to the portion of vessel forming an extension.

Preferably, this flat conducting washer is perforated axially with openings for the passage of the fluid, which may in this case be introduced into the reactor, preferably axially, upstream of said flat conducting washer.

According to a possible feature, the reactor comprises:
  a conical conducting washer having an apex joined to the tubular body of the second electrode downstream of the flow holes of said body and a base situated upstream of said flow holes, which base is extended by a connection rim configured to enable its fastening to the portion of vessel delimiting the reaction chamber and also preferably, if applicable, to the portion of vessel forming an extension, and
  a second jack in contact with the connection rim of the conical conducting washer for the connection of the second electrode to the source of alternating voltage.

The conical conducting washer thus serves both for the supply of electricity of the second electrode and for the ducting of the fluid: it makes it possible in simple manner to connect the tubular body of the second electrode to a jack; furthermore, it forms a conical abutment for the fluid arriving axially, which conical abutment deviates the fluid towards the central axis and thereby forces the fluid towards the flow holes of the tubular body of the second electrode.

According to a possible feature, the reactor comprises an inlet end formation, preferably formed by a connector in accordance with a standard, for example of DN16 type, arranged upstream of the portion of vessel forming an extension (or, if not that, of the portion of vessel delimiting the reaction chamber) and fastened thereto.

According to a possible feature, the reactor comprises an outlet end formation, preferably formed by a connector in accordance with a standard, for example of DN16 type, arranged downstream of the portion of vessel delimiting the reaction chamber and fastened thereto.

In a particularly economic preferred version, the disclosed subject matter is based on the use of a conventional automotive vehicle spark plug, which is slightly modified as explained below. The reactor according to the disclosed subject matter then comprises a spark plug, comprising a central rod electrode and a plug body lacking any projecting ground electrode, the central rod electrode of the spark plug forming the central rod of the first electrode of the reactor, the plug body of the spark plug forming the tubular body of the second electrode of the reactor, the insulator of the spark plug corresponding to the insulator of the reactor defined supra.

Two minor modifications of the conventional spark plug are thus necessary: the projecting ground electrode which extends the plug body and faces the downstream end of the central electrode in the conventional plug is severed at its base such that the plug body has a planar circular end (which corresponds to the discharge end of the second electrode of the reactor); flow holes are formed in the plug body, substantially radially or in an inclined direction (between a radial direction and the axial direction, and going downstream, that is to say towards the discharge end of the plug).

The disclosed subject matter extends to a turning plasma reactor characterized in combination by all or some of the features referred to above and below.

BRIEF DESCRIPTION OF THE DRAWING

Other details and advantages of the present disclosed subject matter will appear from the reading of the following description, which refers to the diagrammatic appended drawings and which relates to preferred embodiments, provided by way of non-limiting examples. In the drawings:

FIG. 5 is a diagrammatic front view of a control disk according to the disclosed subject matter, FIG. 6 is a longitudinal cross-section of the control disk of FIG. 5.

DETAILED DESCRIPTION

Figure 2:
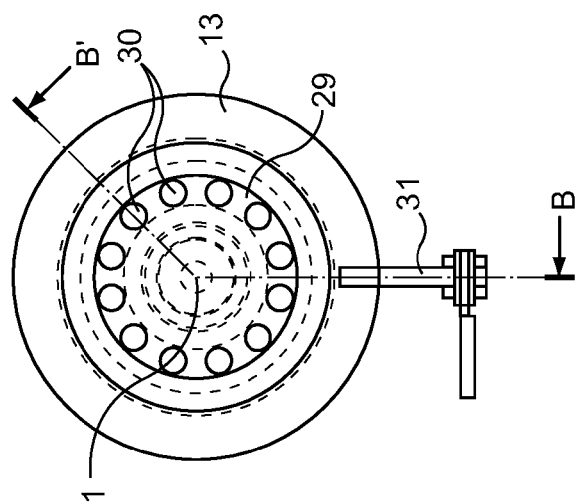
FIG. 2 is a diagrammatic front view of the turning plasma reactor FIG. 1.
Figure 1:
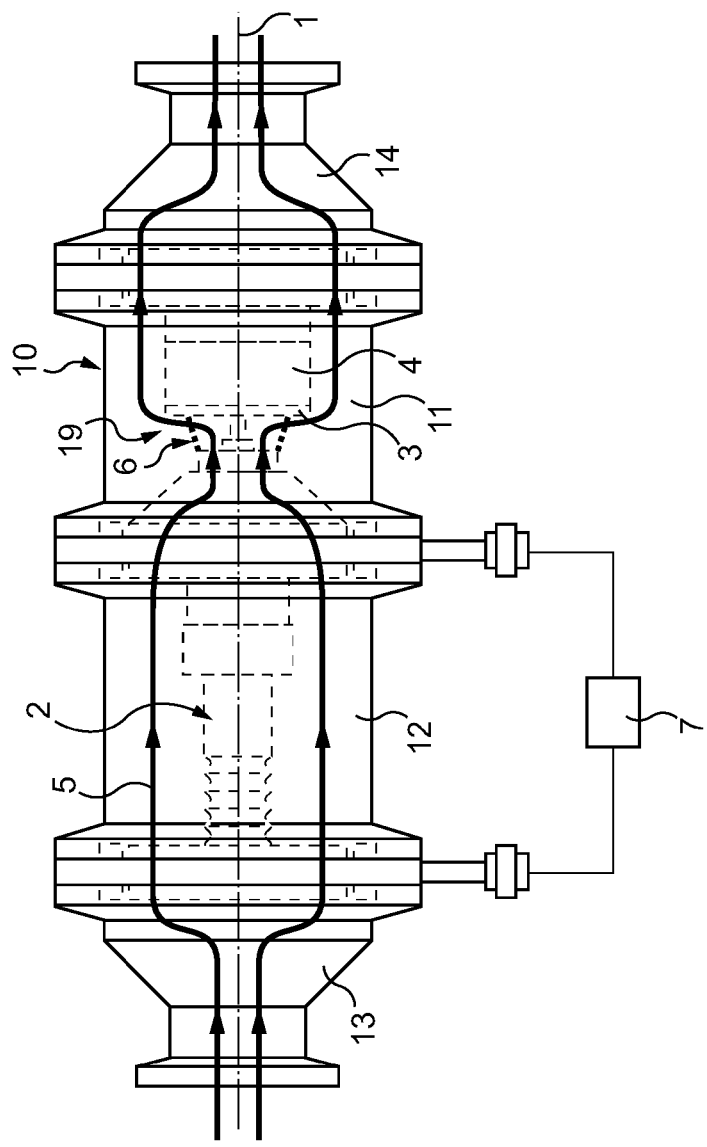
FIG. 1 is a diagrammatic side view of a preferred embodiment of a turning plasma reactor according to the disclosed subject matter.
Figure 4:
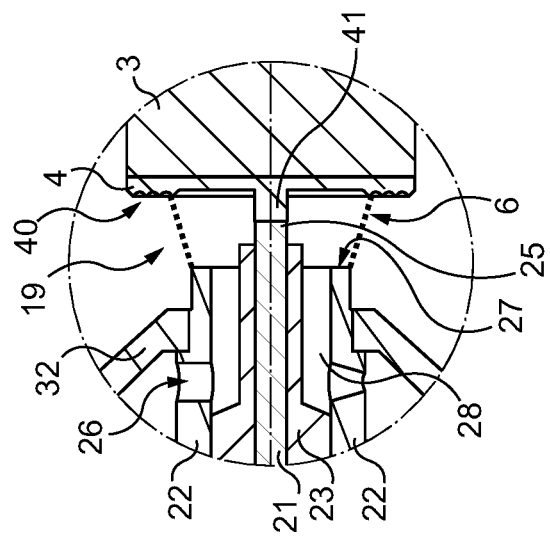
FIG. 4 is an enlargement of a portion of the plasma reactor FIG. 3.
Figure 3:
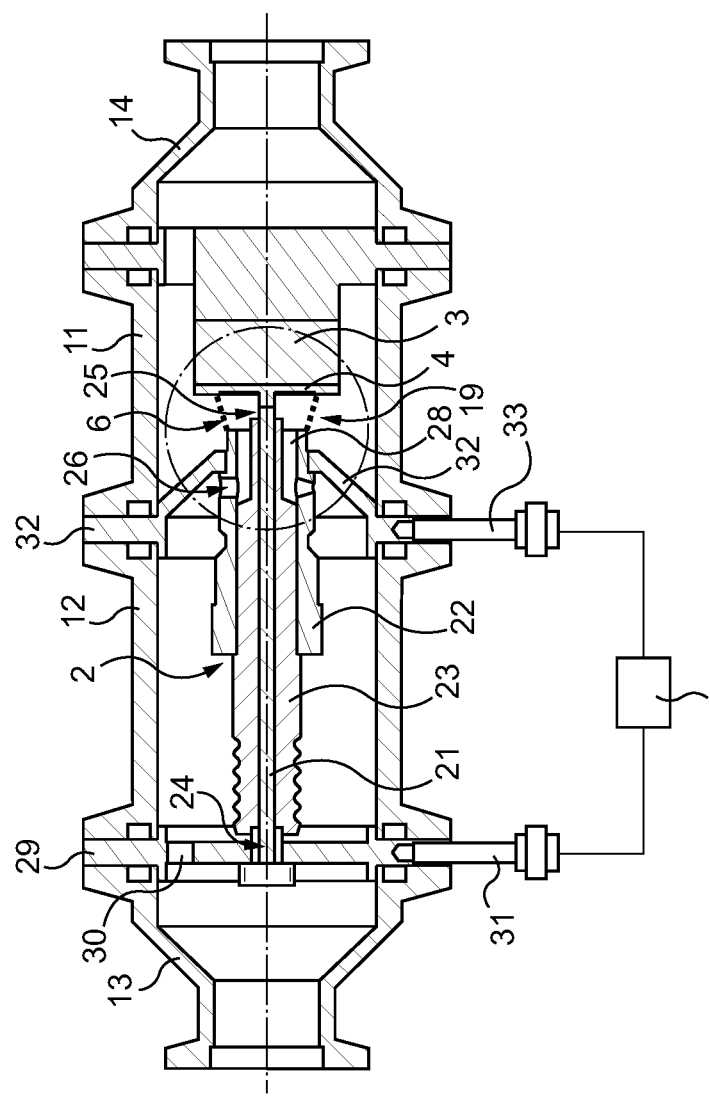
FIG. 3 is a longitudinal cross-section view on B'B, as identified in FIG. 2, of the plasma reactor of FIG. 1.

In accordance with the preferred version of the disclosed subject matter, the reactor illustrated in FIGS. 1 to 3 basically comprises: a spark plug 2, a vessel 10, a permanent magnet 3, a control disk 4 and an electrical source.

The vessel 10 comprises a vessel portion 11 delimiting a reaction chamber 19, a vessel portion 12 forming an extension, an inlet end formation 13 formed by a connector in accordance with a standard of DN 16 type, by which the fluid (reagents) is introduced axially into the reactor, and an outlet end formation 14 formed by a connector in accordance with a standard of DN 16 type, by which the fluid (reaction products and any reagents that have not reacted) leave the reactor axially. The vessel 10 has symmetry of revolution around a central axis 1. The vessel portions 11 and 12 are substantially cylindrical—of circular cross-section—with the exception of their axial ends which are in the form of flanges. These vessel portions 11 and 12 are of a structural material, preferably transparent and light, such as poly(methyl methacrylate) known under the trade name Plexiglas®. The use of connectors in accordance with a standard to form the inlet 13 and outlet 14 end formations facilitates the integration of the reactor according to the disclosed subject matter into a system and also facilitates the connection in series of several reactors according to the disclosed subject matter.

In the whole of the description, the terms "upstream" and "downstream" make reference to the axial direction defined by the central axis 1 of the reactor and to the overall direction of flow of the fluid 5. In FIGS. 1 and 3, this overall direction of flow goes from left to right.

The spark plug 2 is a conventional spark plug for a gasoline automotive vehicle, wherein it is possible to recognize a central electrode 21 with a rod (referred to as central rod 21 below), an insulator 23 of ceramic and a metal plug body 22. In usual manner, the central rod 21 has a downstream end 25 which extends axially projecting from the insulator 23, and an opposite end which is also "bare" (that is to say lacking insulator at its periphery) so as to provide a connection zone 24.

On account of the presence of a shoulder in the insulator 23, a cylindrical space 28, here called cylindrical flow space, appears between the insulator 23 and the plug body 22 near the downstream end 25 of the central rod 21.

The central rod 21 of the spark plug 2 forms part of a first electrode of the plasma reactor, whereas the plug body 22 forms part of a second electrode of the plasma reactor.

The spark plug 2 is arranged within the vessel 10 such that its central axis coincides with the central axis 1 of the reactor and that the downstream end 25 of its central electrode 21 is situated in the reaction chamber 19 of the reactor.

The conventional spark plug 2 has undergone two modifications:
  flow holes 26 with radial axes and which are open to the cylindrical flow space 28 have been formed in the plug body 22;
  the ground electrode which usually extends the plug body by forming a projecting leg facing the downstream end 25 of the central end has been severed (it does not therefore appear in the drawings) such that the plug body 22 has an end face 27, here called discharge end, which is planar (it extends in a transverse plane at a right angle to the central axis 1).

The permanent magnet 3 is a disk-shaped magnet of which the axis coincides with the central axis 1 of the reactor. It is advantageously a neodymium magnet.

The control disk 4 is of an electrically conducting material, for example copper. It has a front face 40 described in more detail later, and a back face which is juxtaposed against the permanent magnet 3 and is of the same diameter as the latter. Like the permanent magnet 3, the control disk 4 is centered on the central axis 1 of the reactor.

At its center, the front face 40 of the control disk 4 has a lug 41 which links it to the downstream end 25 of the central rod 21 of the spark plug. The control disk 4 thus extends the central rod 21 and forms part of the first electrode of the reactor.

The front face 40 of the control disk has recessed concentric zones, obtained by etching for example: a first central zone 42 with a flat base and rounded corners, three circular grooves 43 and an outer chamfer 44. These etched zones form four concentric circular ribs 45 defining four circles for starting electric arcs.

In operation, the electric arcs are produced under the effect of the potential difference between the two electrodes, between the discharge end 27 of the plug body (second electrode of the reactor) and the front face 40 of the control disk (first electrode of the reactor). These electric arcs form a reaction cone 6 generating a tubular curtain of plasma. Reference 6 designates at the same time the reaction cone (as a geometric shape upon which are defined the electric arcs generated) and the tubular curtain of plasma (resulting from the effect of the electric arcs on the flowing fluid).

The circular shape of the ribs 45 provided on the front face 40 of the control disk is advantageous given the symmetry of revolution of the permanent magnet 3 and of the magnetic field it generates. This circular shape makes it possible to obtain a turning electric arc moving at constant speed. It limits the risks of interruption of the tubular curtain of plasma 6 obtained.

The presence, on the front face 40 of the disk 4 of several circular ribs 45 of different diameters makes it possible to have several circles for starting electric arcs situated at different distances from the other electrode (discharge end 27 of the plug body). The chances of easily triggering an electric arc and of maintaining a turning plasma curtain are thus multiplied and a same disk may, furthermore, be used for different applications. According to the disclosed subject matter, it therefore suffices for the front face of the control disk to have at least one circular rib.

In the illustrated non-limiting example, the distance in the axial direction between the discharge end 27 of the plug body and the front face 40 of the control disk is 5.2 mm. The distance between a point of the outer circular ridge of the discharge end 27 of the plug body and a point of the control disk 4 situated in the same longitudinal plane and on the rib 45 of smaller diameter is 5.5 mm. The diameter of the control disk 4 and of the permanent magnet 3 is 22 mm. The depth of the etched zone 42 and grooves 43 is 0.5 mm. The slope of the ribs 45 is 45°.

Among the most influential parameters on the operation of the reactor there may be mentioned: the radius of the rib of the control disk 4, the distance between that rib and the discharge end 27 of the plug body, the characteristics of the permanent magnet 3, the flow rate and pressure of the reagents present, the voltage (and thus the potential difference between the two electrodes of the reactor) and the frequency of the electrical source 7. These various parameters are to be optimized according to the application concerned. It may be that the dimensions indicated previously by way of example are not optimum according to the envisioned application.

The reactor furthermore comprises a flat washer 29, linked at its center to the connection zone 24 of the central rod 21 and fastened, on one side, to a downstream end of the inlet end formation 13 and, on the other side, to an upstream end of the vessel portion 12 forming an extension. A threaded rod 31 is screwed into a radial bore of that flat washer. This threaded rod 31 serves as a jack for the electrical connection of the first electrode of the reactor to the source of alternating voltage 7. The flat washer 29 is perforated with a plurality of openings 30 in the axial direction, which enable the passage of the fluid from the inlet end formation 13 towards the extension 12.

The reactor furthermore comprises a conical washer 32 of which the perforated apex of the cone clamps round the plug body 22 downstream of the flow holes 26, and of which the base of the cone is extended by a flange fastened, on one side, to a downstream side of the vessel portion 12 forming an extension and, on the other side, to an upstream end of the vessel portion 11 delimiting the reaction chamber. A radial bore is formed in that flange for receiving a threaded rod 33 serving as a jack for the electrical connection of the second electrode of the reactor to the source of alternating voltage. The conical shape of the washer 32 constrains the fluid arriving axially from the inlet end formation 13 and the extension 12 towards the flow holes 26. The manner (means used, such as a pump, flow rate chosen, etc.) in which the flow of the fluid is made to occur in the system in which the reactor is integrated depends on the application considered and makes no difference to the present disclosed subject matter. The fluid may for example be introduced into the reactor using a pump (not shown) arranged upstream or downstream thereof. Inside the reactor, the flow path of the fluid may be seen in FIG. 1.

As may be noted, the reactor assembly may be manufactured from parts that are simple and commonplace, commercially available at affordable or even low prices. The assembly obtained is very compact: the example illustrated (excluding the supply source 7) has a maximum outside diameter of 55 mm (outside diameter of the flat washer 29 and of the flange of the conical washer 32) and a length of 153 mm. The reactor provides a very good yield which may easily be optimized in particular by adapting the distance between the discharge end 27 of the second electrode and the control disk 4 as well as the pattern in relief provided on the front face 40 of the latter, in particular according to the reaction desired and the flow rate of the fluid.

The disclosed subject matter may be the subject of numerous variants relative to the embodiments described above and illustrated, for example in the choice of the materials used, in the dimensions etc., provided that they remain within the scope defined by the appended claims.

The invention claimed is:

1. A plasma reactor configured to form a plasma in a flowing fluid, the reactor comprising:
    a first electrode and a second electrode connected to a source of alternating voltage and configured to create electric arcs between the first and second electrodes to generate a plasma in the flowing fluid and a portion of a vessel delimiting a reaction chamber that contains the plasma,
    wherein the first electrode comprises a central rod on a central axis of the reactor, where the rod is enveloped with an insulator, except for a downstream end in a fluid flow direction that projects from the insulator and a connection region thereof,
    the second electrode comprises a tubular body surrounding the insulator and having a discharge end in the reaction chamber,
    the reactor includes a conducting control disk having a front face linked to the downstream end of the central rod of the first electrode,
    the reactor further comprises a permanent magnet juxtaposed against a back face of the control disk,
    one or more grooves or ribs are on a front face of the control disk according to a pattern in relief and configured to define successive electric arc starting points distributed around the central axis of the reactor so as to generate electric arcs that define a reaction cone and that turn around the central axis, and
    the reactor has a cylindrical space configured to accommodate the flowing fluid between the tubular body and the insulator, and into which the fluid enters and exist within the reaction cone.

2. The plasma reactor according to claim 1, wherein the pattern in relief on the front face of the control disk comprises at least one circular rib.

3. The plasma reactor according to claim 1, wherein the discharge end of the tubular body of the second electrode is planar.

4. The plasma reactor according to claim 1, wherein the tubular body of the second electrode is perforated with flow holes open to the cylindrical flow space.

5. The plasma reactor according to claim 4, further comprising:

a conical conducting washer having an apex joined to the tubular body of the second electrode downstream of the flow holes of the body and a base situated upstream of the flow holes, the base extended by a connection rim configured to enable its fastening to the portion of vessel delimiting the reaction chamber; and a second jack in contact with the connection rim of the conical conducting washer for the connection of the second electrode to the source of alternating voltage.

6. The plasma reactor according to claim 1, wherein the control disk and the permanent magnet each have a greater diameter than an outside diameter of the discharge end of the tubular body of the second electrode.

7. The plasma reactor according to claim 1, wherein the portion of the vessel delimiting the reaction chamber comprises a transparent material.

8. The plasma reactor according to claim 1, wherein the reactor further comprises a portion of the vessel that extends axially and upstream in the fluid flow direction of the portion of the vessel delimiting the reaction chamber.

9. The plasma reactor according to claim 8, further comprising:
an inlet end formation formed by a connector in accordance with a standard upstream of the portion of the vessel forming an extension and fastened thereto; and an outlet end formation formed by a connector in accordance with a standard downstream of the portion of the vessel delimiting the reaction chamber and fastened thereto.

10. The plasma reactor according to claim 1, further comprising:
a flat conducting washer attached to a connection region of the central rod of the first electrode; and a first jack in contact with the flat conducting washer and configured to connect the first electrode to the source of alternating voltage, the flat conducting washer further configured to fasten to a portion of vessel forming an extension, the flat conducting washer axially perforated with openings for the passage of the flowing fluid.

11. The plasma reactor according to claim 1, further comprising a spark plug, the spark plug comprising a central rod electrode and a plug body lacking any projecting ground electrode, the central rod electrode of the spark plug forming the central rod of the first electrode of the reactor, the plug body of the spark plug forming the tubular body of the second electrode of the reactor, the insulator of the spark plug corresponding to the insulator of the reactor.

* * * * *

UNITED STATES PATENT AND TRADEMARK OFFICE
CERTIFICATE OF CORRECTION

PATENT NO. : 9,744,517 B2
APPLICATION NO. : 15/171576
DATED : August 29, 2017
INVENTOR(S) : Laurent Hourdin It is certified that error appears in the above-identified patent and that said Letters Patent is hereby corrected as shown below:

In the Claims

In Column 8, Claim 1, Line 55, after "the fluid enters and" replace "exist" with --exits--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*